(12) United States Patent
Glenn

(10) Patent No.: US 11,450,243 B2
(45) Date of Patent: Sep. 20, 2022

(54) TRI-DIRECTIONAL MOUNTING BRACKET, SYSTEM, AND METHOD

(71) Applicant: Mission Dice, LLC, New Hope, MN (US)

(72) Inventor: Noah D. Glenn, Champlin, MN (US)

(73) Assignee: Mission Dice, LLC, New Hope, MN (US)

( * ) Notice: Subject to any disclaimer, the term of this patent is extended or adjusted under 35 U.S.C. 154(b) by 0 days.

(21) Appl. No.: 17/332,309

(22) Filed: May 27, 2021

(65) Prior Publication Data
US 2021/0327310 A1 Oct. 21, 2021

Related U.S. Application Data

(63) Continuation-in-part of application No. 16/501,482, filed on Aug. 23, 2019, now abandoned.

(51) Int. Cl.
*G09F 7/18* (2006.01)
*F16M 11/04* (2006.01)

(52) U.S. Cl.
CPC ............. *G09F 7/18* (2013.01); *F16M 11/041* (2013.01); *G09F 2007/1804* (2013.01)

(58) Field of Classification Search
CPC . G09F 7/18; G09F 2007/1804; F16M 11/041; F16M 11/16; F16M 11/245; F16M 13/027; F16M 13/04; F16M 11/04; F16M 13/02
See application file for complete search history.

(56) References Cited

U.S. PATENT DOCUMENTS

| 1,475,041 | A | * | 11/1923 | Alstott | G09F 11/02 40/493 |
|---|---|---|---|---|---|
| 1,509,125 | A | * | 9/1924 | Burbank | A47F 5/02 40/493 |
| 1,521,995 | A | * | 1/1925 | Burbank | A47F 5/04 211/163 |
| 3,199,239 | A | * | 8/1965 | Reed | G09F 11/025 40/505 |
| 3,931,894 | A | | 1/1976 | Murphy | |
| 5,003,716 | A | * | 4/1991 | Dyar | G09F 11/025 40/502 |
| 5,050,747 | A | | 9/1991 | Krautsack | |
| 5,347,734 | A | * | 9/1994 | Howell | G09F 1/10 211/163 |
| 5,378,056 | A | | 1/1995 | Wilson et al. | |

(Continued)

*Primary Examiner* — Ko H Chan
(74) *Attorney, Agent, or Firm* — Devora Law, PLLC; Antonio Devora

(57) ABSTRACT

A tri-directional bracket, system, and method is for displaying information is disclosed. The bracket includes a set of sides connected to each other defining a generally triangular prism, a first end cap connected to the set of sides at a first end, a second end cap, connected to the set of sides at a second end, a stop cap connected to the set of sides, positioned between the first end and the second end, and a guide connected to the set of sides, positioned between the stop cap and the second end cap. A handle is connected to the first end cap. A 360-degree viewing angle defined by the set of sides. A set of displays is connected to the tri-directional bracket and a computing device is connected to the set of displays to display information. The bracket is then connected to a mounting structure, such as a tripod.

16 Claims, 6 Drawing Sheets

(56) References Cited

U.S. PATENT DOCUMENTS

| | | | |
|---|---|---|---|
| 5,462,178 A | 10/1995 | Wallach et al. | |
| 5,528,258 A * | 6/1996 | Moon | G09F 11/025 340/815.58 |
| 5,796,585 A | 8/1998 | Sugiyama et al. | |
| 5,956,210 A | 9/1999 | Kaneko | |
| 6,256,912 B1 * | 7/2001 | Gibson | G09F 3/20 40/493 |
| 6,405,879 B1 * | 6/2002 | Fox | A47F 7/141 211/113 |
| 6,536,369 B1 | 3/2003 | Bent et al. | |
| RE38,707 E * | 3/2005 | Merkel | A47B 47/042 108/180 |
| 6,975,207 B1 * | 12/2005 | Shmelzer | G06Q 30/0601 340/10.6 |
| 7,152,488 B2 | 12/2006 | Hedrich et al. | |
| 8,534,472 B2 * | 9/2013 | Levine | A47F 5/02 211/163 |
| 8,712,721 B2 | 4/2014 | Hamel et al. | |
| 8,894,146 B2 | 11/2014 | Denike | |
| 9,984,385 B2 * | 5/2018 | McManus | B65D 25/04 |
| 10,001,255 B2 * | 6/2018 | Minsky | F21V 1/12 |
| 2004/0226167 A1 | 11/2004 | Tseng et al. | |
| 2005/0258121 A1 | 11/2005 | Shea | |
| 2007/0272641 A1 | 11/2007 | Wong et al. | |
| 2008/0237169 A1 * | 10/2008 | May | A47B 23/00 211/195 |
| 2009/0319381 A1 * | 12/2009 | Armstrong | G06Q 20/204 705/15 |
| 2016/0030829 A1 * | 2/2016 | Rowsey | A63B 71/0622 340/323 R |
| 2016/0120303 A1 | 5/2016 | Constantino et al. | |

\* cited by examiner

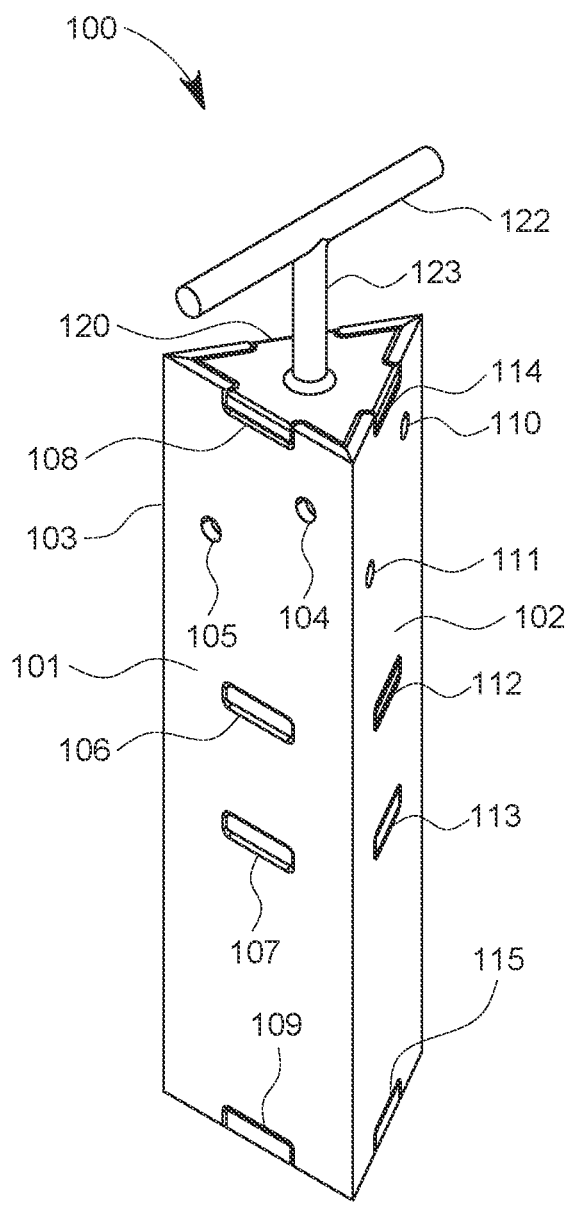
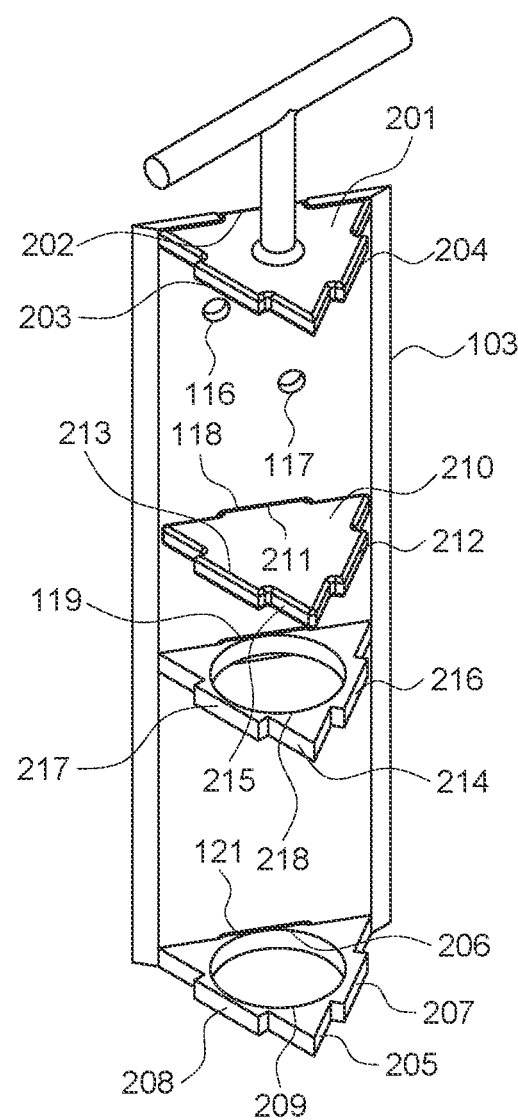
FIG. 1
FIG. 2

TRI-DIRECTIONAL MOUNTING BRACKET, SYSTEM, AND METHOD

CROSS-REFERENCE TO RELATED APPLICATION

This application is a continuation-in-part of U.S. application Ser. No. 16/501,482, filed Aug. 23, 2019. This patent application is incorporated by reference herein in its entirety to provide continuity of disclosure.

FIELD OF THE INVENTION

The present invention relates to mounting hardware. In particular, the present invention relates to a bracket, system, and method for mounting multiple displays on the same fixture.

BACKGROUND OF THE INVENTION

Electronic displays are presently utilized in a multitude of ways. For example, electronic displays are used as electronic billboards, video and scoreboards at sporting events and concerts, and informational displays at conventions. However, these implementations utilize two dimensional displays restricting the viewing angle of a viewer. For example, the current solution on the market uses a simple bracket allowing users to mount display electronics, such as televisions, monitors, and tablets, in a two-sided way, i.e., the electronic devices sit back-to-back to each other with the screens facing outward. The problem with this solution is that it still restricts the viewing angle of a viewer. Specifically, viewers at certain angles are not able to see the information that is being displayed on devices using a two-sided bracket. The prior art has attempted to solve this problem.

For example, U.S. Publication No. 2004/0226167 to Tseng et al. discloses a screw mounting jig that supports an electronic device thereon. The electronic device includes a first surface and a second surface opposite to the first surface. A first screw hole is formed on the first surface, and a second screw hole is formed on the second surface. The jig includes a base and a supporting assembly. The electronic device is received in the supporting assembly. The supporting assembly is disposed on the base in a manner such that it rotates between a first position and a second position. When the supporting assembly is located at the first position, the first surface faces the base so that the second screw hole is exposed for insertion. When the supporting assembly is located at the second position, the second surface faces the base so that the first screw hole is exposed for insertion. However, the screw mounting jig in Tseng et al. still would limit the viewing angle of viewers to a maximum of approximately 180 degrees.

U.S. Pat. No. 5,796,585 to Sugiyama et al. discloses an electronic equipment mounting device. The mounting device includes a mounting jig on which a plurality of tongues is formed and a housing whose flat faces having different areas have slits in them, the tongues being inserted into the slits in a detachable manner. The mounting jig is mounted on, for example, the surface of a wall, and then the housing is coupled to the mounting jig by selectively using one of its side faces. However, since the mounting jig in Sugiyama et al. is mounted on a wall, any display mounted to the mounting jig would be limited to a viewing angle of no greater than 180 degrees.

U.S. Pat. No. 5,956,210 to Kaneko discloses a structure and jig for mounting spring arm on corresponding head arm, which can meet the requirement for high recording density in a disk apparatus by effectively reducing the vibration of the head unit in operation. A head actuator includes at least a pair of heads mounted at the forward end of the head arm through the spring arm for reading/writing information in a discoidal recording medium. The base of the spring arm is fixedly welded to a fixing member. The head arm and the fixing member are coupled to each other by a caulking protrusion as a coupler formed on the fixing member. The overlapped portion of the head arm and the fixing member other than the coupler is formed with a vibration damping layer for preventing vibrations of one of the head arm and the fixing member from propagating to the other. This vibration damping layer is composed of a simple air gap or a vibration damping material filled in the air gap. Assuming a display could be mounted to the structure and jig, the viewing angle would be limited to no more than 180 degrees.

Therefore, there is a need in the art for a mounting bracket that provides a viewing angle of greater than 180 degrees. There is a further need in the art for a mounting bracket and system that provides a 360-degree view of the set of displays mounted thereon.

SUMMARY

A tri-directional bracket, system, and method is for displaying information is disclosed. The bracket includes a first side, a second side connected to the first side, a third side connected to the second side and first side, a first end cap connected to the first side, the second side, and the third side at a first end, a second end cap, connected to the first side, the second side, and the third side at a second end, a stop cap connected to the first side, the second side, and the third side, positioned between the first end and the second end, and a guide connected to the first side, the second side, and the third side, positioned between the stop cap and the second end cap. A handle is connected to the first end cap. A 360-degree viewing angle defined by the first side, the second side, and the third side.

A set of displays is then connected to the tri-directional bracket and a computing device is preferably then connected to the set of displays to display information. The bracket is then connected to a mounting structure, such as a tripod.

A method for providing a 360-degree viewing angle includes the steps of providing a tri-directional bracket, mounting a set of displays to the tri-directional bracket, connecting the tri-directional bracket to a mounting structure, and displaying information on the set of displays.

The tri-directional bracket is an improvement over existing technology because it enables users to mount displays, such as televisions, monitors, and tablets, in a 360-degree manner, which is an improvement over the current two-sided solution that is available on the market today. Viewers at all angles can see the information that is being displayed on the display devices utilizing the tri-directional bracket.

The tri-directional bracket and system may be used at tradeshows, high schools, colleges, wrestling (as a mat-side clock and scoreboard), basketball (courtside clock and scoreboard), volleyball (courtside clock and scoreboard), other sporting events that keep score and/or time, government conventions, hotels, bars, concerts, and other entities that have information to display to viewers.

The tri-directional bracket solves several problems of the prior art. First, the tri-directional bracket allows users to display their information in a 360-degree manner. By identifying and addressing this issue, the inventor has realized the market for these types of products has expanded from a stationary desk mounted bracket holding up a computer monitor and a fixed wall mounted bracket holding up a television at events (such as a mobile scoreboard) and mobile information sites at conventions centers. Second, the tri-directional bracket provides benefits to users by allowing them to display their information in an improved manner, and thereby viewers to see the user's information from anywhere in the room or facility.

BRIEF DESCRIPTION OF THE DRAWINGS

In the detailed description presented below, reference will be made to the following drawings.

FIG. 1 is an isometric view of a bracket of a preferred embodiment.

FIG. 2 is an isometric view of a bracket with sides removed of a preferred embodiment.

DETAILED DESCRIPTION

Figure 3:
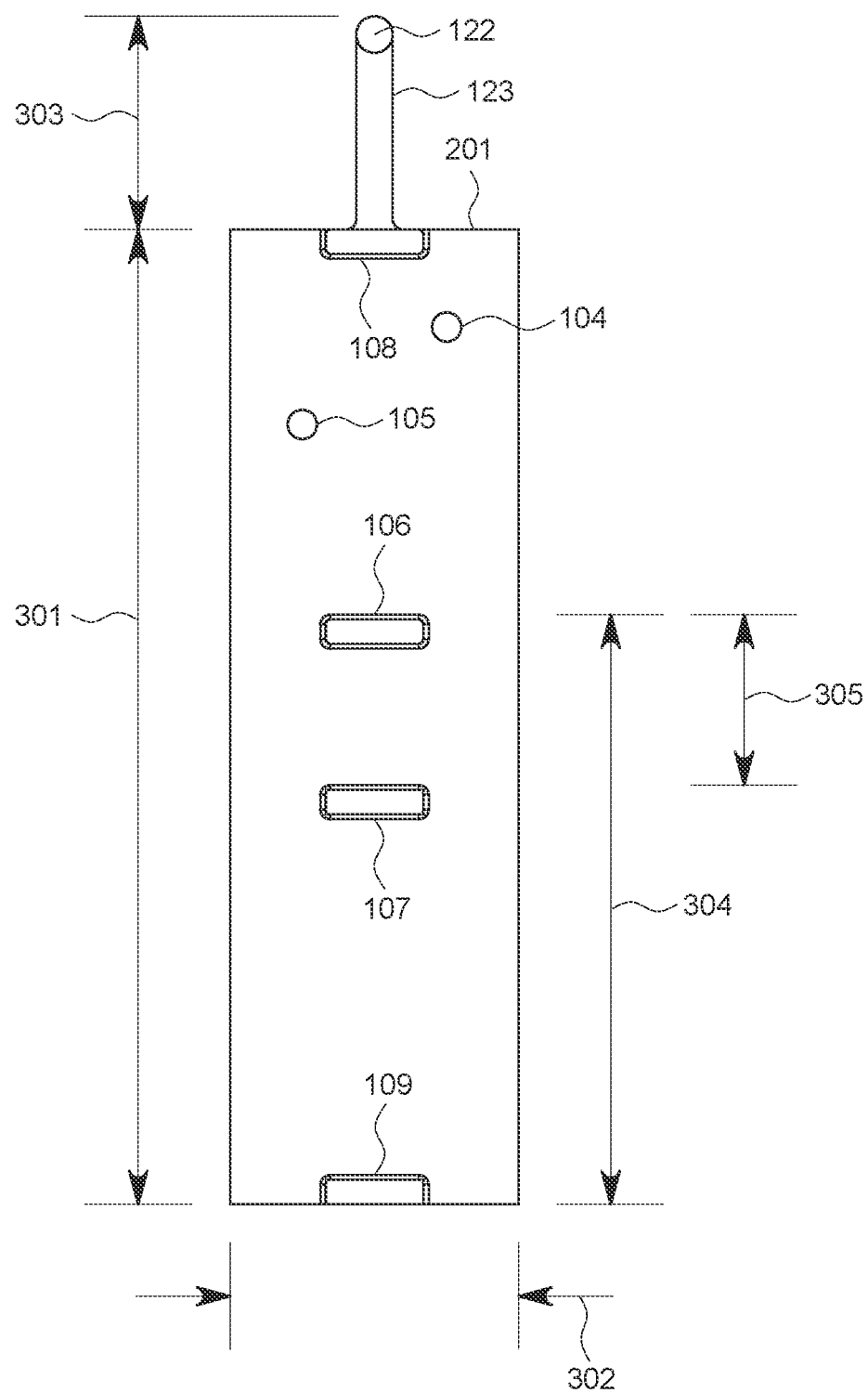
FIG. 3 is a side view of a bracket of a preferred embodiment.

Referring to FIGS. 1 and 2, bracket 100 includes sides 101, 102, and 103 connected to form a generally triangular prism body. Side 101 includes holes 104 and 105, slots 106 and 107, and recesses 108 and 109. Side 102 includes holes 110 and 111, slots 112 and 113, and recesses 114 and 115. Side 103 includes holes 116 and 117, slots 118 and 119, and recesses 120 and 121. Handle 122 is connected to support 123. Support 123 is connected to end cap 201.

End cap 201 includes tabs 202, 203, and 204. Tab 202 is received in recess 120 of side 103. Tab 203 is received in recess 108 of side 101. Tab 204 is received in recess 114 of side 102. End cap 205 is positioned opposite of end cap 201 and connected to sides 101, 102, and 103 and includes tabs 206, 207, and 208. End cap 205 further includes hole 209. Tab 206 is received in recess 121 of side 103. Tab 207 is received in recess 115 of side 102. Tab 208 is received in recess 109 of side 101.

Stop cap 210 is positioned approximately half-way between end caps 201 and 205 and includes tabs 211, 212, and 213. Tab 211 is received in slot 118 of side 103. Tab 212 is received in slot 112 of side 102. Tab 213 is received in slot 106 of side 101. Guide 214 is positioned between end cap 205 and stop cap 210 and includes tabs 215, 216, and 217. Guide 214 further includes hole 218. Tab 215 is received in slot 119 of side 103. Tab 216 is received in slot 113 of side 102. Tab 217 is received in slot 107 of side 101. Holes 218 and 209 are preferably centrally aligned with respect to each other.

In a preferred embodiment, each of sides 101, 102, and 103 is made of steel having a thickness of approximately 18 gauge or approximately 0.048-inch. Other suitable materials and thicknesses known in the art may be employed, such as metals, metal alloys, plastics, and carbon fibers.

In a preferred embodiment, each of end caps 201 and 205, stop cap 210, and guide 214 is made of steel each having a thickness of approximately 18 gauge or approximately 0.048-inch. Other suitable materials and thicknesses known in the art may be employed, such as metals, metal alloys, plastics, and carbon fibers.

In a preferred embodiment, sides 101, 102, and 103 are fuse welded to end caps 201 and 205, stop cap 210, and guide 214 at their respective recesses, tabs, and slots. Other suitable attachment means known in the art may be employed.

In a preferred embodiment, each of handle 122 and support 123 is made from steel round bar having a diameter of approximately ⅜-inch. In this embodiment, handle 122 is welded to support 123, and support 123 is welded to end cap 201. Other suitable materials and attachment means known in the art may be employed.

Referring to FIG. 3 by way of example, side 101 has length 301 and width 302. In a preferred embodiment, length 301 is approximately 12 inches and width 302 is approximately 3 inches. Other suitable dimensions known in the art may be employed.

In some embodiments, holes 104 and 105 are positioned according to the corresponding holes on a display and/or an adaptor to be mounted to side 101. In these embodiments, holes 104 and 105 are sized according to the type of fasteners employed. In other embodiments, holes 104 and 105 are locations for self-tapping fasteners employed to mount a display and/or an adaptor on side 101.

Slot 106 is located at length 304 from an end of side 101, which is approximately half of length 301. In a preferred embodiment, length 304 is approximately 6 inches. Slot 106 and slot 107 are separated by distance 305. In a preferred embodiment, distance 305 is approximately 1.5 inches. Each of slots 106 and 107 is sized to accommodate tabs 213 and 217 respectively, which is preferably approximately 1.5 inches each. Likewise, each of recesses 108 and 109 is sized to accommodate tabs 203 and 208 respectively which is approximately 1.5 inches each. Other suitable dimensions known in the art may be employed.

Each of sides 102 and 103 has the same dimensions as side 101.

In a preferred embodiment, handle 122 has a height 303 from end cap 201, which is approximately 2 inches. Other suitable heights known in the art may be employed.

Figure 4:
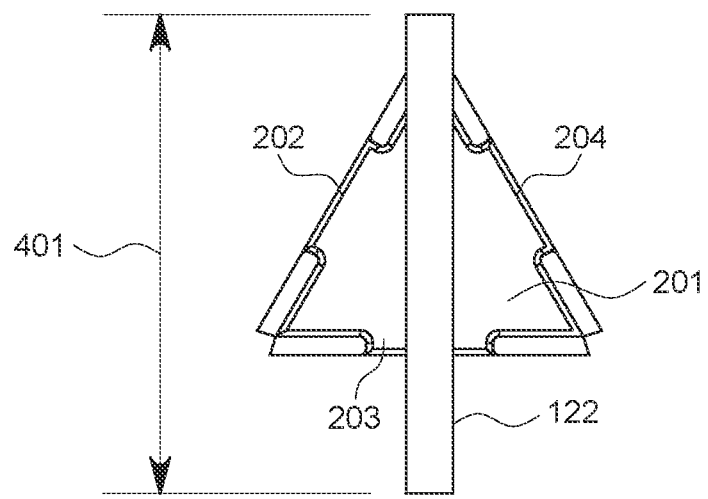
FIG. 4 is a top view of a bracket of a preferred embodiment.

Referring to FIG. 4 by way of example, each of tabs 202, 203, and 204 of end cap 201 has a width of approximately 1 inch and a depth of approximately 0.048-inch. Other suitable dimensions known in the art may employed. Stop cap 210 has the same dimensions as end cap 201.

Handle 122 has length 401, which is preferably approximately 4 inches. Other suitable dimensions known in the art may be employed.

Figure 5:
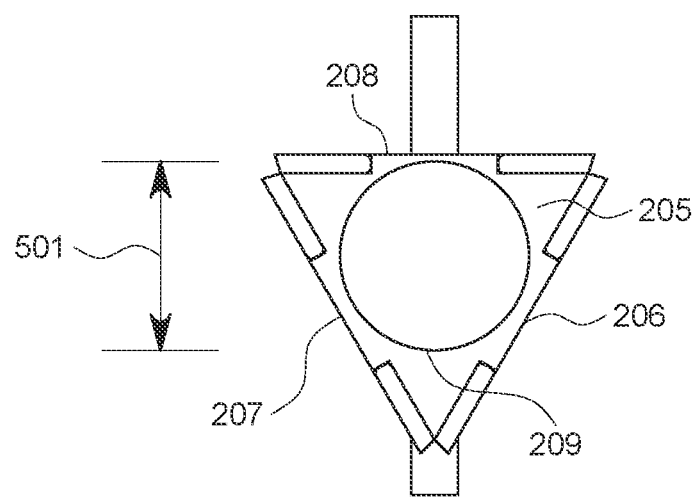
FIG. 5 is a bottom view of a bracket of a preferred embodiment.

Referring to FIG. 5 by way of example, hole 209 of end cap 205 has diameter 501, which is approximately 1.5 inches to accommodate other known mounting hardware, such as a tripod. Other suitable dimensions known in the art may be employed.

Each of tabs 206, 207, and 208 of end cap 205 has a width of approximately 1 inch and a depth of approximately 0.048-inch. Other suitable dimensions known in the art may be employed. Guide 214 has the same dimensions as end cap 205.

Figure 6:
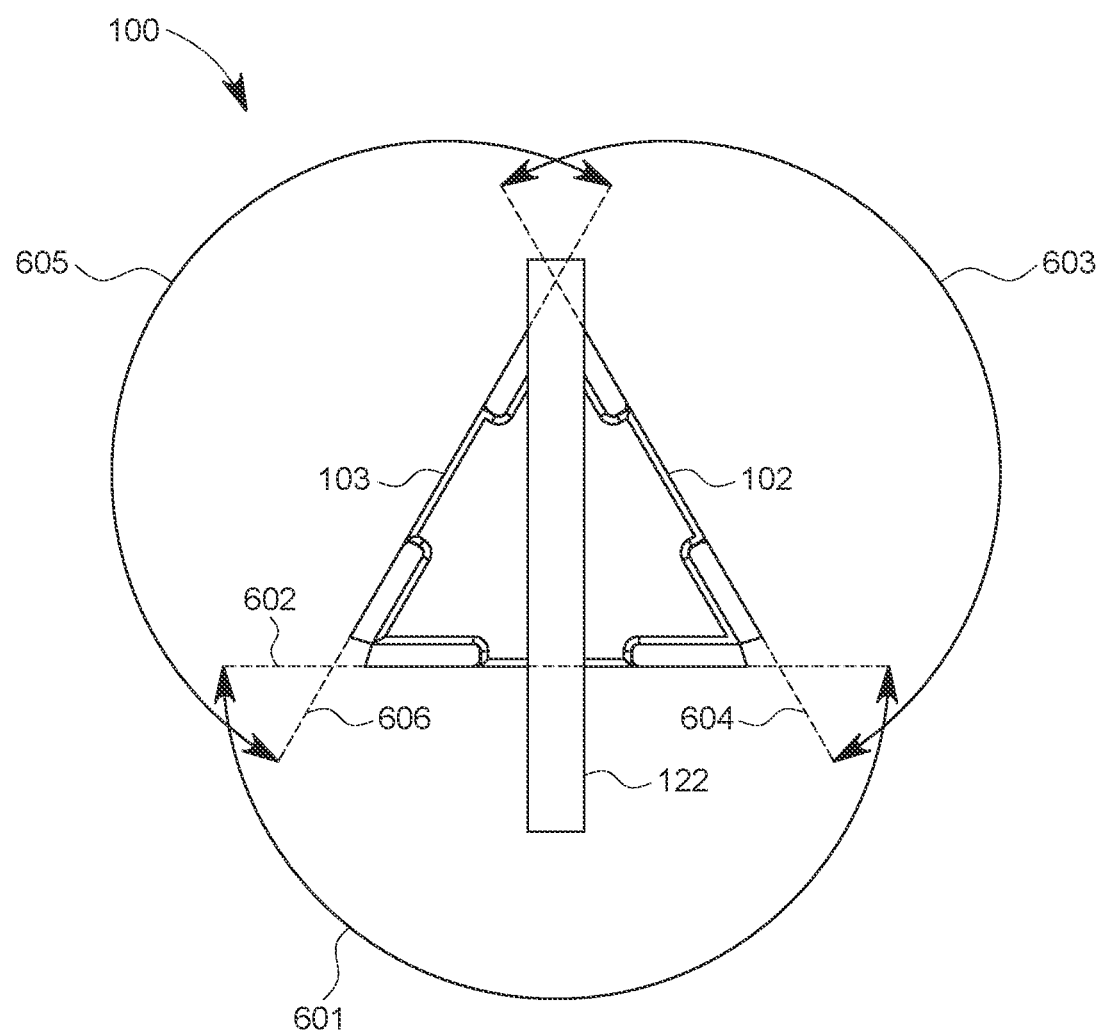
FIG. 6 is a top view of a bracket and a set of viewing angles thereof of a preferred embodiment.

Referring to FIG. 6, side 101 defines viewing angle 601 for a first display mounted to side 101 along plane 602. Side 102 defines viewing angle 603 for a second display mounted to side 102 along plane 604. Side 103 defines viewing angle 605 for a third display mounted to side 103 along plane 606. Each of viewing angles 601, 603, and 605 overlaps with the other such that when combined, viewing angles 601, 603, and 605 define a 360-degree viewing angle simultaneously.

In a preferred embodiment, each of viewing angles 601, 603, and 605 is approximately 180 degrees about planes 602, 604, and 606, respectively. Other suitable angles may be employed so long as when combined, the combined viewing angle is 360 degrees simultaneously.

Figure 7:
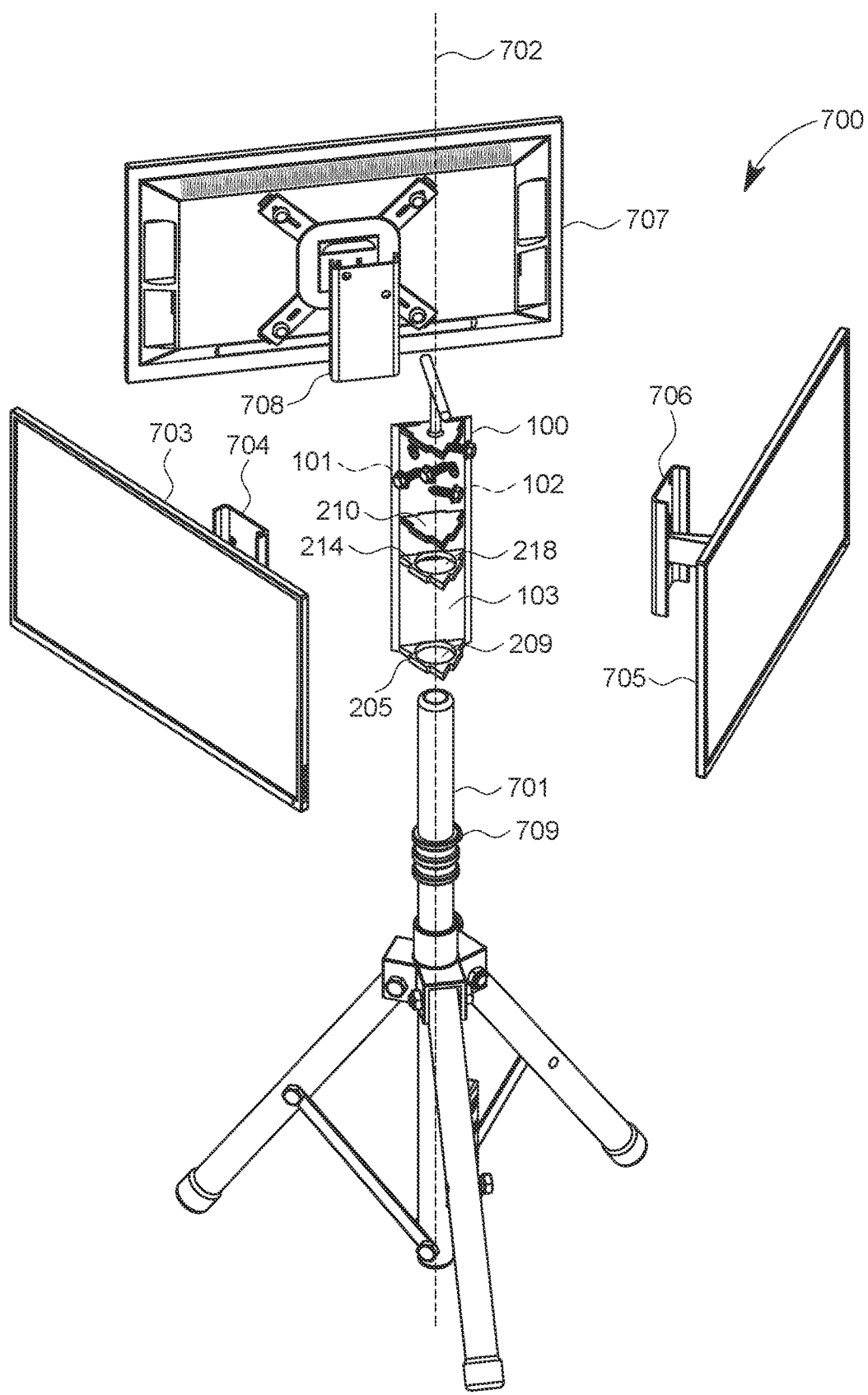
FIG. 7 is an exploded isometric view of a bracket system of a preferred embodiment.

Referring to FIG. 7 in use, in system 700 bracket 100 is mounted to tripod 701 along axis 702. Tripod 701 is received in hole 209 of end cap 205, is further received in hole 218 of guide 214 and preferably abuts stop cap 210. In other embodiments, end cap 205 abuts set of annular rings 709 on tripod 701. In other embodiments, tripod 701 abuts stop cap 210 and end cap 205 abuts set of annular rings 709. In other embodiments, bracket 100 is hung via handle 122 from a structure such as a ceiling, beam, or extension from a wall.

Display 703 is connected to side 101 of bracket 100 with adapter 704 and a set of fasteners. Display 705 is connected to side 102 of bracket 100 with adapter 706 and a set of fasteners. Display 707 is connected to side 103 of bracket 100 with adapter 708. Each of displays 703, 705, and 707 preferably has a substantially flat display surface, thereby defining a 360-degree viewing angle at once as previously described.

In a preferred embodiment, tripod 701 is a Proline speaker stand. Other suitable tripods and mounting structures enabling sides 101, 102, and 103 to be viewed known in the art may be employed.

In a preferred embodiment, each of adapters 704, 706, and 708 is a Bracken TV mount. Other suitable adapters known in the art may be employed.

In a preferred embodiment, the set of fasteners are self-tapping screws. Other suitable fasteners known in the art may be employed.

In a preferred embodiment, each of displays 703, 705, and 707 is an Insignia 32-inch LED TV electronic display. Other electronic displays, including tablets, monitors, smartphones, televisions, video displays, scoreboards, digital billboards, and dynamic message signs may be employed. In these embodiments, any suitable computing device is connected to displays 703, 705, and 707 to control the information displayed thereon. In other embodiments, static displays may be employed, including graphical signage. Any combination of displays may be employed for displays 703, 705, 707.

Figure 8:
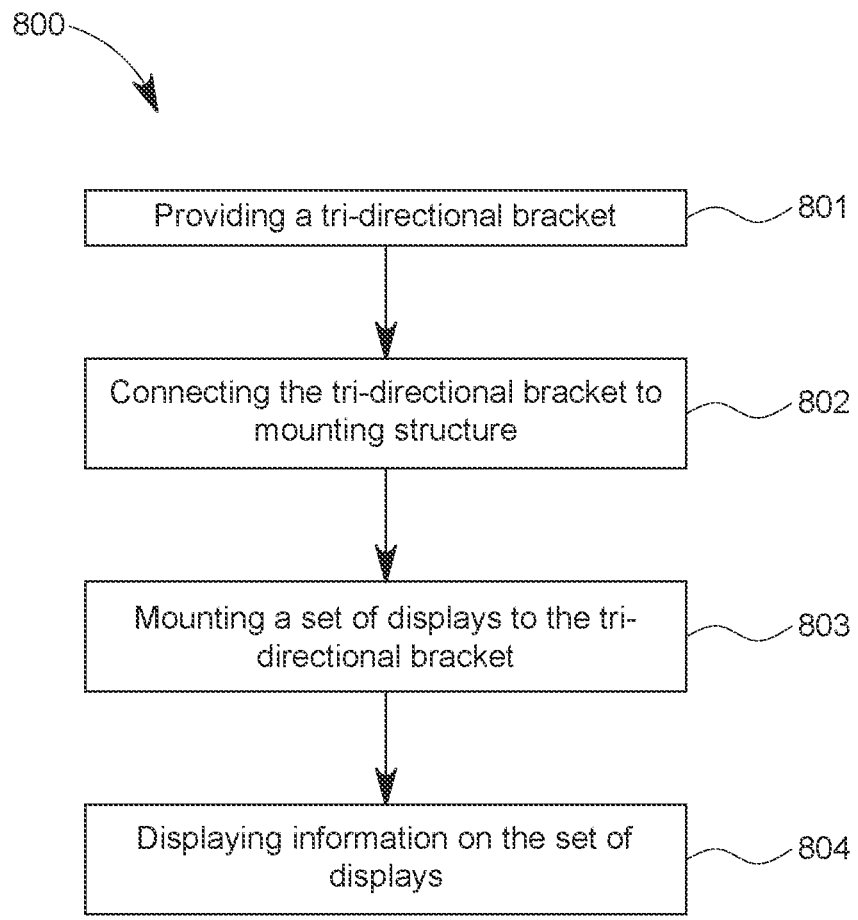
FIG. 8 is a flowchart of a method for creating a 360-degree viewing angle utilizing a tri-directional system of a preferred embodiment.

Referring to FIG. 8, method 800 for providing a 360-degree viewing angle is described. At step 801 tri-directional bracket 100 is provided. As previously described, bracket 100 provides a simultaneous 360-degree viewing angle. At step 802, bracket 100 is connected to a mounting structure, such as a tripod or hung from a mounting structure such as a ceiling, beam, or extension from a surface such as a wall. In other embodiments, bracket 100 is set atop another structure such as a shelf. At step 803, a set of displays is mounted to bracket 100. Any type of displays known in the art may be employed. At step 804, information is displayed on the set of displays. Consequently, information may be viewed from 360 degrees around the set of displays mounted to bracket 100.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A bracket for displaying information comprising:
    a first side;
    a second side connected to the first side;
    a third side connected to the second side and first side;
    a first end cap connected to the first side, the second side, and the third side at a first end;
    a second end cap, connected to the first side, the second side, and the third side at a second end, opposite the first end;
    a stop cap connected to the first side, the second side, and the third side, positioned between the first end and the second end, comprising a stop surface continuously extending between the first, the second side, and the third side; and,
    a guide connected to the first side, the second side, and the third side, positioned between the stop cap and the second end cap.

2. The bracket of claim 1, further comprising a handle connected to the first end cap.

3. The bracket of claim 1, further comprising a 360-degree viewing angle defined by the first side, the second side, and the third side.

4. The bracket of claim 1, further comprising a triangular prism defined by the first side, the second side, and the third side.

5. The bracket of claim 1, wherein the stop cap comprises a first set of tabs.

6. The bracket of claim 5, wherein the guide comprises a second set of tabs.

7. The bracket of claim 6, wherein the first side comprises a first set of slots sized to receive the first set of tabs and the second set of tabs.

8. The bracket of claim 6, wherein the second side comprises a second set of slots sized to receive the first set of tabs and the second set of tabs.

9. The bracket of claim 6, wherein the third side comprises a third set of slots sized to receive the first set of tabs and the second set of tabs.

10. The bracket of claim 1, wherein the second end cap comprises a first hole.

11. The bracket of claim 10, wherein the guide comprises a second hole.

12. A viewing system comprising:
    a set of sides connected to each other;
    a triangular prism defined by the set of sides;
    a composite viewing angle defined by the set of sides;
    a set of displays connected to the set of sides;
    a first end cap connected to the set of sides at a first end;
    a second end cap comprising a first hole, connected to the set of sides at a second end;
    a stop cap surface connected to, and continuously extending between, each of the set of sides and,
    a guide comprising a second hole, connected to the set of sides between the stop cap surface and the second end cap.

13. The viewing system of claim 12, further comprising a handle connected to the first end cap.

14. The viewing system of claim 12, further comprising a computing device connected to the set of displays.

15. The viewing system of claim 12, wherein the set of sides comprises:
    a first side;
    a second side connected to the first side; and, a third side connected to the first side and to the second side.

16. The viewing system of claim 15, wherein the composite viewing angle comprises:
a first viewing angle associated with the first side;
a second viewing angle associated with the second side; and,
a third viewing angle associated with the third side.

* * * * *